(12) United States Patent
Nielsen et al.

(10) Patent No.: US 8,061,622 B2
(45) Date of Patent: Nov. 22, 2011

(54) ELECTRONIC PAYMENT, INFORMATION, OR ID CARD WITH A DEFORMATION SENSING MEANS

(75) Inventors: Finn Nielsen, Copenhagen (DK); Rune Domsten, Broshoj (DK)

(73) Assignee: Cardlab Aps, Copenhagen K (DK)

( * ) Notice: Subject to any disclaimer, the term of this patent is extended or adjusted under 35 U.S.C. 154(b) by 0 days.

(21) Appl. No.: 12/086,414

(22) PCT Filed: Feb. 27, 2008

(86) PCT No.: PCT/EP2008/052377
§ 371 (c)(1),
(2), (4) Date: Aug. 31, 2010

(87) PCT Pub. No.: WO2008/104567
PCT Pub. Date: Sep. 4, 2008

(65) Prior Publication Data
US 2010/0320274 A1 Dec. 23, 2010

Related U.S. Application Data

(60) Provisional application No. 60/903,834, filed on Feb. 28, 2007.

(51) Int. Cl.
*G06K 19/06* (2006.01)
(52) U.S. Cl. ........................ 235/492; 235/494
(58) Field of Classification Search .................. 235/492, 235/494
See application file for complete search history.

(56) References Cited

U.S. PATENT DOCUMENTS

| | | | |
|---|---|---|---|
| 5,247,164 A * | 9/1993 | Takahashi | 235/492 |
| 5,791,966 A | 8/1998 | Capps et al. | |
| 7,347,381 B2 * | 3/2008 | Rathbun et al. | 235/492 |
| 2002/0104891 A1 * | 8/2002 | Otto | 235/494 |
| 2003/0169574 A1 | 9/2003 | Maruyama et al. | |
| 2005/0277360 A1 | 12/2005 | Benedek et al. | |
| 2006/0214009 A1 * | 9/2006 | Shikata et al. | 235/492 |

FOREIGN PATENT DOCUMENTS

| | | |
|---|---|---|
| DE | 199 47 180 A1 | 4/2001 |
| DE | 101 40 662 C1 | 3/2003 |
| DE | 103 42 054 A1 | 4/2005 |
| FR | 2 728 710 | 6/1996 |
| JP | 2 307792 | 12/1990 |
| WO | WO 03/027949 A1 | 4/2003 |
| WO | WO 2007/113722 A1 | 10/2007 |

OTHER PUBLICATIONS

Vila-Virella, C., et al., Http://web.mit.edu/6.222/www/s2005/PROJECT/Groups/1/main.html, "TextWand Programmable LED Display".

* cited by examiner

*Primary Examiner* — Allyson Trail
(74) *Attorney, Agent, or Firm* — Jacobson Holman PLLC

(57) ABSTRACT

A portable card, such as a credit card, having therein electronics, such as a processor, and a deformable switching element or sensor, where the deformation or bending of the sensor/switch is determined and used for controlling the electronics. In one aspect, bending of a piezo element provides power for bringing a processor out of a sleep mode.

23 Claims, 2 Drawing Sheets

ELECTRONIC PAYMENT, INFORMATION, OR ID CARD WITH A DEFORMATION SENSING MEANS

This is a national stage of PCT/EP08/052,377 filed Feb. 27, 2008 and published in English, claiming benefit of U.S. provisional application No. 60/903,834, filed Feb. 28, 2007.

BACKGROUND OF THE INVENTION

1. Field of the Invention

The present invention relates to portable cards, such as ID cards, information cards, or payment cards, having an electric circuit which transitions from one mode to the other when instructed to do so by a user.

2. Description of the Related Art

This type of technology may be used for a variety of purposes. One purpose is seen as a switch in e.g. a payment card or identification card in which a processor or other electronic circuit is operated or receives instructions from the user via a switch. In order to increase the life time of the card, it is desired that the processor and switch use power only when required.

Normally, such cards comprise mechanical domes or membrane switches which are to be depressed by the user in order to e.g. activate the processor. Such switches have a number of disadvantages. Domes extend from the generally flat surface of the card and the production/lamination process of the card may render the dome switch useless. Both switch solutions require a current flow during operation, and a switch, which is permanently deformed in the depressed state, may swiftly deplete the power source of the card.

Different types of card sensors or the like may be seen in US2003/169574, DE19947180, JP02307792, DE10342054 and WO03/027949.

Another purpose for the present deformable sensing means is for use in detecting or determining deformation of the card for e.g. providing visible information to a user. Tops providing information while rotating may be seen in U.S. Pat. No. 5,791,966 or US 2005/0277360). In http://www-.loadsmorestuff.com/product_info.php?products_id=1085 and http://web.mit.edu/6.111/www/s2005/PROJECT/Groups/1/main.html, products are seen which provide information while being waved. These products, however, are stiff boxes, and seem to be quite simple set-ups.

SUMMARY OF THE INVENTION

In a first aspect, the invention relates to a portable card comprising an electronic circuit adapted to operate in each of a first and a second mode and a sensing means electronically connected to the circuit, the sensing means comprising a piezo electric element being adapted to output an electrical signal when being deformed, the circuit being able to transition from the first to the second mode when receiving the signal,
wherein the circuit comprises a processor, the first mode being a sleep mode and the second mode being an operating mode of the processor.

In the present context, deforming the sensing means will mean bringing the sensing means away from a rest position by, normally, providing a force thereto. This force is normally provided at an angle to a direction along which the sensing means has an extent larger than perpendicularly thereto. Thus, bending of an elongate object normally is achieved by providing a force at an angle to the longitudinal axis thereof, and bending of a disc-shaped element normally is achieved by providing a force at an angle to a plane of the disc- or plate-shaped element.

Naturally, the sensing means need not be plane in the rest position, whereas it may be plane in the bent or stressed/deformed position.

The present sensor type is a piezo electric element in that this additionally has the ability to provide power when deformed or bent. Thus, this type of sensor does not require power in order to be operative and need therefore not be connected to any power source.

Normally, the sleep mode is a mode with a lower power consumption and the operating mode is a mode with a higher power consumption. Thus, the sensing means, when deformed, is adapted to provide a signal or power to the processor so as to bring the processor from the sleep mode to the operating mode. Thus, power saving may be achieved by the processor using no or very little power before the sensor is bent/deformed.

Preferably, the card is rather small, such as having outer dimensions of: a length of less than 10 cm, a width of less than 5 cm, and a thickness of less than 2 mm. The mostly preferred card has the size of a standard credit card or ID card.

Suitably, the card comprises a flexible base element to which the sensing means is fixed in order for the card to be bendable or deformable in order to infer the bending/deformation to the sensing means. Thus, the sensing means may be fully embedded in the card, such as during lamination of the card, and still be operable from the outside of the card. Naturally, the card may comprise any number of layers, such as layers laminated to the base element. This is known in the art of providing e.g. chip cards.

In one embodiment, the sensing means, in a cross section perpendicular to a plane of the card, is provided adjacent to a layer or element being softer at a centre of the sensing means than (a material or element positioned) at outer parts thereof. Thus, the sensing means may be forced toward the softer layer so as to deform the softer layer while deforming the sensing means. Thus, a switch type element may be provided which may still be fully positioned within the, normally, two generally flat major outer surfaces of a card. Naturally, a dome on top of the sensing means could also be used to provide a hammer effect when the dome is depressed.

When the transition is performed when bending/deforming the sensing means, it may, in certain situations, be noticed if the sensing means or the card is often bent/deformed without further actions taken, whereby the resulting transition might not be meant to be taking place. The bending/deformation may be performed accidentally. One situation may be when a rhythmic bending is detected, such as when the sensor is bent/deformed by a person walking/running/dancing.

In such situations, the card may further comprise means for reducing a sensitivity to deformation of the sensing means or reducing the circuit's sensitivity to the signal from the sensing means.

In a preferred embodiment, the card further comprises an operating means adapted to be operated and initiate a task, the reducing means being operated, if a predetermined number of deformations of the sensing means have been detected while no operation of the operating means has been performed.

The operating means may be the sensing means operated once more or a means sensing another input, such as the entering a code on a keyboard of the card, reading a fingerprint by a fingerprint reader of the card, the card sensing proximity of a card reader, an optical sensor of the card sensing an optical signal or the like.

Naturally, the mode change may be performed or maintained until a new deformation of the sensing means is performed or for a period of time after the initial deformation. This period of time may simply be determined by a timing device, an RC circuit being provided with a voltage at the time of (or actually by the) deformation of the sensing device and subsequently decaying. The point of time of mode change then being either at the time of deformation or when the voltage of the decaying RC circuit reaching a threshold.

In one embodiment, the circuit may be circuitry of an RFID tag, where the transmitting/receiving circuit thereof is enabled or disabled when the sensing means is deformed, or a predetermined period of time thereafter. Actually, the operation of the RFID tag may be powered by power provided by the sensing means when deformed. In this situation, no battery may be required to have the RFID tag operate.

It should be noted that the deformation of the sensing means may be determined and used for multiple purposes. The first operation or "click" thereof may be used for the transition. A "double click" may be used for starting a predetermined task, and any number of deformations, such as performed within a certain period of time or with no longer than a predetermined period of time between individual deformations (much as the use of a computer mouse or a cell phone) may be used as inputs and for controlling the operation of the card circuit. As will be described further below, a quantification of the deformation may alternatively be used for selecting a mode.

Especially when the card further comprises a power source to which the processor is coupled, the sensing means being adapted to provide the power/signal from the operation of the sensing means, an advantage is seen when the sensing means need not be or is not connected to the power source. In that manner, malfunctioning of the sensing means need not deplete the power source.

Normally, intelligent cards also comprise means for outputting information from the card. Such means may be one or more magnetic stripes, active or passive (changeable or not by the circuit/processor), via electrically conducting pads on the card, or via wireless means, such as radio waves, magnetic fields, RFID, IR radiation, or Bluetooth. Naturally, this communication may be controlled by the processor and may be initiated only when e.g. the processor has been awakened by operation of the sensor.

In a number of interesting embodiments, the card further comprises means for presenting visual information. This visible information may inform the user of a status of or a process performed by the circuit. It may be used for outputting information to the user for use in other processes, such as codes to be entered into an ATM, a computer, a console or the like.

In a particular embodiment, the card comprises means for providing, on the basis of the signal from the sensing means, second information or signals to the presenting means. Thus, information may be derived and used as to the degree or amount of deformation, direction of deformation, frequency of the deformation, or other information derivable from the deformation.

The sensing means may be adapted to output a signal with a voltage and/or current related to the degree and/or direction of deformation, or a time duration of the signal may be used for estimating the degree of deformation.

A second aspect of the invention relates to a card of this type in that the card comprises:
 a flexible base element,
 means for presenting visual information,
 sensing means for detecting a bending of the base element and outputting a signal,
 means for receiving the signal from the sensing means and determining, on the basis of the signal, second information or signals to the presenting means.

In this context, a flexible element is an element adapted to flex or bend when waved.

Waving being e.g. a person holding a part of the element and moving the element in a reciprocal manner. Then, the element will bend or flex due to the changing accelerations and the flexibility thereof as well as wind resistance acting on the card during the waving.

Also, a card, presently, is an element having a dimension with a significantly smaller extent than the other 2 dimensions (thickness vs. width and length), primarily in that this facilitates the bending desired. However, a relatively large "thickness", compared to e.g. credit cards, may be used, as long as the base element remains flexible.

Visual information may be any type of visual information, such as images, pictures, text, or the like. This information will be seen by a person as a 2D image, even though provided by a presenter having a smaller cross section one dimension due to the slow nature of the human eye system.

The detecting or quantification of the bending is able to generate information describing the movement of the presenting means, which information is used by the receiving means controlling the presenting means.

In the particular embodiment of the first aspect or in the second aspect, the sensing means may be positioned at or on a side of the base element or at an outer part, surface, or edge of the card, and be adapted to output a signal corresponding to a stretching/compression of the sensing means. Thus, standard elements, such as piezo electric transducers, strain gauges, or pressure sensitive resistors may be used.

Some types of accelerometers or deformation detectors are actually able to, if fed a suitable signal, output a sound. Thus, in one situation in the particular embodiment of the first aspect or in the second aspect, the sensing means are additionally adapted to provide a sound corresponding to a received signal, the card further comprising means for providing a signal to the sensing means.

Preferably, the card has a first edge and one or more opposing edges, the presenting means being positioned at or on the first edge of the card, and the sensing means are positioned closer to the opposing edge(s) than the first edge. In this manner, the card is actually adapted to be held between the opposing edge(s) and the sensing means, whereby waving of the card preferably will create the largest bending at the sensing means.

In a preferred embodiment, the presenting means comprises one or more, normally parallel, rows of light emitters each being controllable by the determining means. Any number of rows may be used, and any type of light emitter, such as LED, laser, vxel may be used. Monochrome emitters may be used, a mixture of monochrome emitters may be used so that multicolor information may be provided, or a plurality of emitters adapted to emit light of varying color may be used.

Providing the emitters at the edge merely provides the largest waving distance. The emitters may be provided at any position of the card.

Preferably, the card or the determining means additionally comprises a timing means adapted to provide timing information, the determining means providing the second information also on the basis of the timing information. Thus, not only the bending/acceleration may be used but also the point in time since, e.g., the last turning point of a movement or the last point in time when no bending/acceleration were sensed.

In a preferred embodiment, the determining means is adapted to estimate, from the signal and the timing information, a first distance which the presenting means moves during a reciprocal movement. Thus, this first distance may be the distance between two extreme points of the reciprocal movement. This distance and the timing information may make the determining means able to determine, at all points in time, the actual position of the information presenter.

Then, the determining means may be adapted to hold 2D information to be provided, to sequentially forward, to the presenting means, data representing neighbouring, elongate parts of the 2D information. When performing the reciprocal movement, the providing means will "scan" the distance, and the receiver will forward information to the presenter according to the presenter's position along the distance. Then, naturally, the information transmitted to the provider will represent more elongate parts of the overall 2D information, divided across the direction of bending/waving.

Thus, the 2D information may be seen as provided as a number of lines or columns which are then transmitted sequentially to the presenting means in the same manner as in a CRT. The standard one-direction scanning of the beam of a CRT may be used in order to provide the information only when moving in one direction. Alternatively, the same information may be provided in both directions, whereby the feeding of information to the emitting means is adapted to the actual direction of movement.

In the situation where the presenting means has one or more rows of emitters, the determining means may be adapted to relate a desired extent of the 2D information along a first dimension to the distance and to adapt the number of light emitters of each row of the presenting means (the actual extent of the information provided) to have the 2D information presented by the card during the reciprocating movement have a predetermined relationship between a dimension along the direction of waving and a direction perpendicular thereto.

In another situation, the determining means are adapted to determine, from the 2D information, a second distance required to present the information and to forward to the presenting means a part of the 2D information corresponding to a relation between the first and second distances. Thus, instead of adapting the direction along the rows of emitters, only a part of the 2D information is provided, if the distance of the reciprocal movement is smaller than the second distance required. Then, the user may wish to wave with a larger movement, or he may wish to firstly "wave" a part of the information and then, such as after moving the card to the side, "wave" the remainder of the information.

Thus, if a given image or text is to be provided, the extent along the row of emitters will then vary with the distance of the reciprocal waving. A large distance will then utilize a larger extent of the row of emitters, and a smaller distance will reduce the overall extent of the information also in the direction of the row of emitters.

Naturally, the text or information provided during the reciprocal movement may be stationary (be the same) or may change, such as by scrolling the information. This scrolling may be a horizontal scrolling, where the information provided is moved along the direction of movement much like old-fashioned scrolling ticker tape advertisement or board where the individual data (such as numbers or letters) scroll over the surface by individual light emitters (here in a 2-dimensional display) turning on and of. Alternatively, the scrolling may be in a vertical direction much like the credits at the end of a movie.

In one embodiment, the determining means is adapted to estimate a curve, in a plane of the bending, adopted by the presenting means, and to adapt the second information accordingly. In fact, this curve need not be estimated. It may be pre-programmed in or known to the receiver. This adaptation may be made to e.g. have the information provided seem as if provided by a plane element instead of a curved element. This will mean that the determining means times the providing of individual parts of the 2D element in a particular manner.

In general, the determining means may be adapted to estimate, on the basis of the signal and the timing information, a position of the presenting means and to provide the second information on the basis of the estimated position. Thus, when it is preferred that the same part of the information is provided at the same position (in order to provide a steady image), this position determination is highly desired.

In another aspect, the invention relates to a method of operating a portable card comprising an electronic circuit, comprising a processor, and a sensing means comprising a piezo electric element, the method comprising deforming the piezo electric element whereby the piezo electric element outputs a signal, the processor receiving the signal from the piezo electric element and transitioning from a sleep mode and to an operating mode.

The processor may be brought from the sleep mode and into the operating mode solely on the basis of power or signal generated by the sensor by the bending. In that situation, the sensing means need not draw any power from a power source of the card while the processor is in the sleep mode and the sensor is not bent (or ever, as the piezo electric element may provide the power simply by being deformed).

Then, as is also described above, the card may comprise a flexible base layer to which the sensing means is fixed, wherein the deforming step comprises bending the card or base layer.

Alternatively, the sensing means may, in a cross section perpendicular to a plane of the card, be provided adjacent to a layer or an element being softer at a center of the sensing means than (e.g. another material or element positioned) at outer parts thereof, the deforming step comprises forcing at least a central portion of the sensing means toward the softer layer and thereby deforming the softer layer. In that manner, the sensing means may be provided within the desired, even surfaces of the card while being operable as a switch. The deformation of the sensing means is obtained by depressing the sensing means (or the part above the softer material) toward the softer material so as to deform this material also.

Naturally, the softer material or element may be replaced simply by a hole or cavity in the base layer so as to provide space for the sensing means to deform into.

In one embodiment, the method further comprises the step of reducing a sensitivity of the sensing means or the circuit. This is in particular interesting when the reducing step is preceded by the step of sensing a predetermined number of deformations/bendings of the sensing means while receiving no instruction to perform additional tasks. Such instructions may be received via other types of sensors, such as sweep sensors, contact pads, other switches or the same switch. This is described above.

In one embodiment, the method further comprises the step of presenting visual information to a user from the card. This presenting may be via a display of the card.

Then, an embodiment may be provided which further comprises the step of the circuit providing, on the basis of the signal from the sensing means, second information to the presenting means.

Thus, certain modes of operation may be initiated when deforming the sensing means of the card, and information may be provided to the user as to which mode the card or processor/circuit is in.

In another embodiment, the displacement of a part of the card during bending/deformation is used for providing the information.

This is the object of a next aspect, which relates to the use of the above particular embodiment or the second aspect, this aspect relates to a method comprising:
 bending the card,
 the sensing means providing the signal to the circuit,
 the circuit receiving the signal and providing the second information to the presenting means,
 the presenting means presenting visual information relating to the second information.

In one embodiment the sensing means are positioned at or on a side of the base element and output a signal corresponding to a stretching/compression of the sensing means.

In another embodiment, the sensing means additionally provide a sound corresponding to a second signal. This second signal is provided to the sensing means from e.g. the processor/circuit or from another source. Preferably, no bending/deformation is detected when providing the second signal to the sensing means.

In a preferred embodiment, the card has a first edge and one or more opposing edges, the presenting means being positioned at or on the first edge of the card, the bending primarily taking place closer to the opposing edge(s) than the first edge, and where the sensing means are positioned closer to the opposing edge(s) than the first edge.

As mentioned above, the presenting step comprises each light emitter of one or more rows of light emitters being controlled by the providing means. A large number of emitters may be used.

Preferably, the method further comprises the step of providing timing information, where the second information is determined also on the basis of the timing information.

Then, the method may further comprise the step of estimating, from the signal and the timing information, a first distance which the presenting means moves during a reciprocal movement. This may provide knowledge as to the possible (physical) extent of the information to be provided.

Then, the providing means may hold 2D information to be provided, and sequentially forward, to the presenting means, data representing neighbouring, elongate parts of the 2D information. In this manner, the information is sequentially provided while the presenting means move over the distance of the movement.

In one embodiment, the method may comprise the step of relating an extent of the 2D information along a first dimension to the first distance and adapting the extent of the information provided by the presenting step in a direction perpendicular to the direction of bending to have the 2D information presented by the card during the reciprocating movement have a predetermined relationship between a dimension along the direction of waving and a direction perpendicular thereto. Thus, the scale but not the relationship between the dimensions, may be altered by the movement.

In another embodiment, the method comprises the step of determining, from the 2D information, a second distance required to present the information and to forward to the presenting means a part of the 2D information corresponding to a relation between the first and second distances. Then, a too small distance may bring about that only part of the information is provided.

In one embodiment, the method may comprise the step of estimating a curve, in a plane of the bending, adopted by the presenting means, and adapting the second information accordingly. This may be in order to emulate that the information is provided by a plane element, e.g.

In another embodiment, the method comprises the step of estimating, on the basis of the signal and the timing information, a position of the presenting means and providing the second information on the basis of the estimated position.

In a final aspect, the invention relates to a portable card comprising an electronic circuit adapted to operate in each of a first and a second mode and a sensing means electronically connected to the circuit, the sensing means being adapted to output an electrical signal when being deformed, the circuit being able to transition from the first to the second mode when receiving the signal, wherein, in a cross section perpendicular to a plane of the card, the sensing means is provided adjacent to a layer being softer at a centre of the sensing means than at outer parts thereof.

In the present context, deforming the sensing means will mean bringing the sensing means away from a rest position by, normally, providing a force thereto. This force is normally provided at an angle to a direction along which the sensing means has an extent larger than perpendicularly thereto. Thus, bending of an elongate object normally is achieved by providing a force at an angle to the longitudinal axis thereof, and bending of a disc-shaped element normally is achieved by providing a force at an angle to a plane of the disc- or plate-shaped element.

Naturally, the sensing means need not be plane in the rest position, whereas it may be plane in the bent or stressed/deformed position.

According to this aspect of the invention, the sensing means, in a cross section perpendicular to a plane of the card, is provided adjacent to a layer or element being softer at a center of the sensing means than (a material or element positioned) at outer parts thereof. In fact, not material need be provided at the centre; an opening, an indentation or a hole may suffice. Thus, the sensing means may be forced toward the softer layer so as to deform the softer layer while deforming the sensing means. Thus, a switch type element is provided which may still be fully positioned within the, normally, two generally flat major outer surfaces of a card.

Naturally, a dome on top of the sensing means could also be used to provide a hammer effect when the dome is depressed.

Preferably, the card is rather small, such as having outer dimensions of: a length of less than 10 cm, a width of less than 5 cm, and a thickness of less than 2 mm. The mostly preferred card has the size of a standard credit card or ID card.

Suitably, the card comprises a flexible base element to which the sensing means is fixed in order for the card to be bendable or deformable in order to infer the bending/deformation to the sensing means. Thus, the sensing means may be fully embedded in the card, such as during lamination of the card, and still be operated or operable from the outside of the card. Naturally, the card may comprise any number of layers, such as layers laminated to the base element. This is known in the art of providing e.g. chip cards.

In general, a number of sensor types are useful and activatable by bending/deformation, such as: strain gauge, force sensitive resistor, bending sensor, capacitive sensor, inductive sensor, and/or displacement sensor. The most preferred sensor type is a piezo electric element in that this additionally has the ability to provide power when deformed or bent. Thus, this type of sensor does not require power in order to be operative.

When the transition is performed when bending/deforming the sensing means, it may, in certain situations, be noticed if the sensing means or the card is often bent/deformed without further actions taken, whereby the resulting transition might not be meant to be taking place. The bending/deformation may be performed accidentally. One situation may be when a rhythmic bending is detected, such as when the sensor is bent/deformed by a person walking/running/dancing.

In such situations, the card may further comprise means for reducing a sensitivity to deformation of the sensing means or reducing the circuit's sensitivity to the signal from the sensing means.

In a preferred embodiment, the card further comprises an operating means adapted to be operated and initiate a task, the reducing means being operated, if a predetermined number of deformations of the sensing means have been detected while no operation of the operating means has been performed.

The operating means may be the sensing means operated once more or a means sensing another input, such as the entering a code on a keyboard of the card, reading a fingerprint by a fingerprint reader of the card, the card sensing proximity of a card reader, an optical sensor of the card sensing an optical signal or the like.

In general, an electric circuit may be a very simple circuit or element, or even discrete elements such as a single flip-flop (bistable, e.g.), but may also be much more complex circuitry. Naturally, any function or operation obtainable with a processor may be obtained using a discrete circuit.

A discrete circuit may be a monostable flip-flop which is brought to the unstable mode when the sensing means is deformed. In this mode, the flip-flop may power other circuitry, such as a LED, or a transmitting/receiving circuit.

The modes of the circuit may be simple modes such as those of a flip-flop or be quite different tasks performed by e.g. a processor. The circuit may comprise different parts performing or handling the different modes, or the same part may be able to operate in both modes.

Naturally, the circuit may often comprise a processor, where the first mode could be a sleep mode (such as a mode with a lower power consumption) and the second mode could be an operating mode (such as a mode with a higher power consumption). Thus, the sensing means, when deformed, is adapted to provide a signal or power to the processor so as to bring the processor from the sleep mode to the operating mode. Thus, power saving may be achieved by the processor using no or very little power before the sensor is bent/deformed.

Naturally, the mode change may be performed or maintained until a new deformation of the sensing means is performed or for a period of time after the initial deformation. This period of time may simply be determined by a timing device, an RC circuit being provided with a voltage at the time of (or actually by the) deformation of the sensing device and subsequently decaying. The point of time of mode change then being either at the time of deformation or when the voltage of the decaying RC circuit reaching a threshold.

In one embodiment, the circuit may be circuitry of an RFID tag, where the transmitting/receiving circuit thereof is enabled or disabled when the sensing means is deformed, or a predetermined period of time thereafter. Actually, the operation of the RFID tag may be powered by power provided by the sensing means when deformed. In this situation, no battery may be required to have the RFID tag operate.

It should be noted that the deformation of the sensing means may be determined and used for multiple purposes. The first operation or "click" thereof may be used for the transition. A "double click" may be used for starting a predetermined task, and any number of deformations, such as performed within a certain period of time or with no longer than a predetermined period of time between individual deformations (much as the use of a computer mouse or a cell phone) may be used as inputs and for controlling the operation of the card circuit. As will be described further below, a quantification of the deformation may alternatively be used for selecting a mode.

Especially when the card further comprises a power source to which the processor is coupled, the sensing means being adapted to provide the power/signal from the operation of the sensing means, an advantage is seen when the sensing means need not be connected to the power source. In that manner, malfunctioning of the sensing means need not deplete the power source.

BRIEF DESCRIPTION OF THE DRAWINGS

In the following, a preferred embodiment of the invention will be described with reference to the drawing, wherein.

DETAILED DESCRIPTION OF THE PREFERRED EMBODIMENTS

Figure 1:
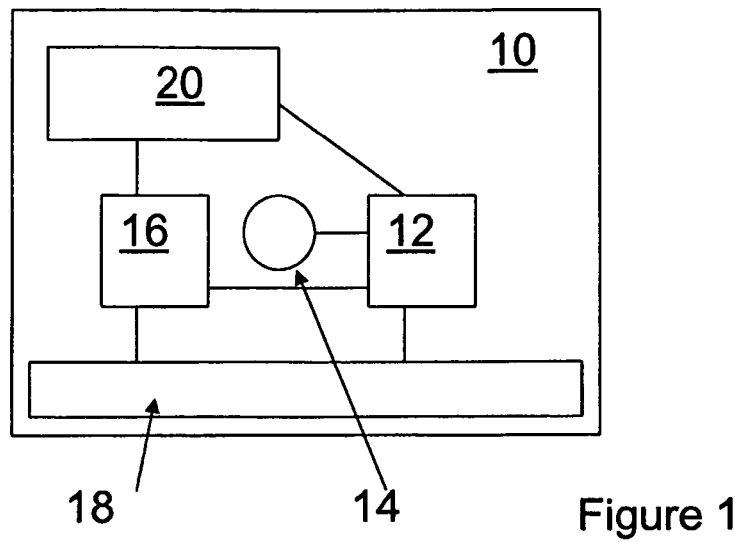
FIG. 1 illustrates elements of a first preferred embodiment of a card according to the invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

The card 10 has a processor 12 connected to a sensor 14, a power supply 16, an output means 18, and a display 20. The power supply 16, which may be a battery or the like, and which may be rechargeable or not, also feeds the output means 18 and the display 20.

Preferably, the card is of the size of a standard credit card and fulfils the requirements of ISO standard No. 7810 relating to the physical characteristics of identification cards.

The output means 18 may be any type of output means, such as an "old fashioned" magnetic strip, a dynamic magnetic strip, which may be controlled by the processor 12 both as to whether to provide a magnetic field and as to which information to provide via the magnetic field. Alternatively or in addition, the outputting means may be one or more electrically conducting pads connected to the processor 12 via which communication with a reader may take place. A further manner of communicating between card and a reader is via wireless standards, such as Bluetooth, RFID, magnetic fields, radio waves, or via electromagnetic radiation. Suitable output means may be seen in WO2005/086102 by the present Applicant.

The processor may comprise one or more memories, such as ROM, FRAM, RAM, PROM, EPROM, EEPROM, Flash, or the like, for storing both data relating to the card, a card owner, and a card user, as well as program instructions controlling the processor. The processor is of a type which may be put into a sleep mode, such as a mode, where no or very little power is consumed. When receiving a signal from the sensor 14, the processor 12 is made active or operable, where after the program thereof controls what takes place. This is performed using power from the power source 16. A preferred processor may be Atmel AVR Tiny or Mega series The processor may control the communication via the output means 18 as well as the display 20 which may be used for providing information to a user. This information may be the identity of the user, in case the card is lost, or to provide e.g. a code (such as a time dependent code) to the user for use in a cash transaction. Naturally, the display 20 is not necessary for the operation of a large number of the uses of a card.

The display may be any suitable display, such as an E-ink display or a Plastic LCD display.

Naturally, the processor may be replaced by a static or hardwired circuit. All operations obtainable by a software-controlled processor are obtainable using a hardwired circuit. This circuit may be extremely simple, such as using only a flip-flop, and it may be used for controlling (enabling or disabling) the output means 18.

The sensor 14 is one which is operable by bending or other deformation. Thus, when bending the sensor 14, such as by bending the card 10, the sensor 14 will transmit a signal to the processor 12 in order to have the processor 12 perform a predetermined task or transition from one mode of operation to another. Presently, the processor 12, when in the power saving sleep mode, is awoken by a signal from the sensor 14, where after a predetermined operation is defined by the program controlling the processor 12.

The preferred sensor 14 is a thin, flat piezo element. This element has the advantage that it generates power (in this situation a voltage) when bent or deformed. This power is transmitted to the processor 12 when in the sleep mode. Thus, the sensor 14 need not be supplied with power, whereby any malfunction of the sensor 14 will not drain unnecessary power from the power source 16.

Thus, the processor 12 is awoken by the signal provided by the sensor 14. In addition, the sensor 14 only provides a signal during bending, whereby a permanent bending thereof will not generate a signal and thereby keep the processor 12 awake or make the processor 12 operate the output means 18 or the display 20, which will be an additional loss of power.

The sensor 14 may be positioned at any desired position of the card 10. Standard ID/credit cards must fulfil certain requirements as to bendability etc, whereby all parts of such cards may receive the sensor 14. In order for the user to gain a good grip of the card 10 for bending it, it is preferred that the sensor 14 is positioned, at the centre of the card.

In order to easily obtain a suitable deformation of the sensor 14, the size thereof (extent in the plane of the card or at least the direction of the bending) may be adapted to the individual use.

Depending on the operation of the card, other types of sensors or other means may be desired to operate the card or to instruct the card 10 or the processor 12 to perform desired actions.

The most simple cards 10 need simply be operated/initiated, where after no further interaction is required.

Other cards may be more complex and may have sensors for sensing e.g. the proximity of a card reader/reader head, upon which it may act to provide information via a magnetic strip.

Other types of cards may be adapted to receive or output information using a wireless technology, such as IR, magnetic fields, RFID, Bluetooth, Radio waves, or the like, and may not initiate output of information before actually receiving information using that technology.

Alternatively, the sensor 14 may be used once more (such as with a predetermined timing between the activations), in order for the card to perform a specified action.

Such additional actions of the elements of the card 10 may be performed only if a certain instruction, action or signal is received after the initial bending/deformation of the sensor 14. If no such additional instruction/action/signal is received, the initial bending of the sensor 14 may be taken to be accidental, and the processor 12 may revert to the sleep mode.

If the sensor 14 is often, such as rhythmically, bent and activated without such additional instruction/action/signal being received, the processor 12 may determine that the sensitivity of the sensor 14 is too high, and this sensitivity may then be lowered in order to reduce the number of accidental or involuntary activations of the sensor 14. Naturally, the sensitivity may again be increased, if no activations have been determined for a period of time, or after an activation followed by the additional instruction/action/signal.

Figure 2:
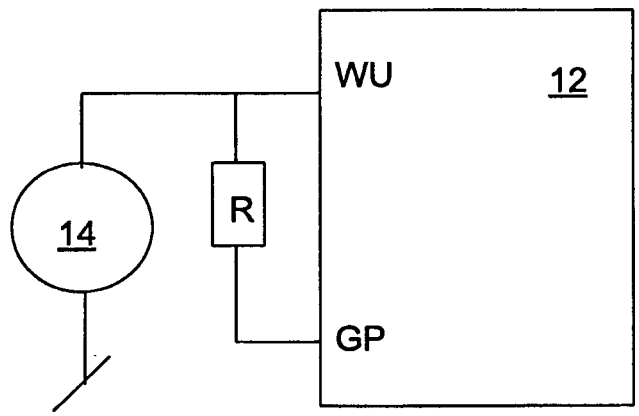
FIG. 2 illustrates a manner of reducing the sensitivity of a piezo sensor.

One manner of reducing the sensitivity of a piezo sensor 14 is seen in FIG. 2, wherein the sensor 14 is positioned between ground and a Wake-Up (WU) input of the processor 12. The output of the sensor 14 is also, via a resistor R, connected to a General Purpose (GP) output of the processor. Not operating the GP-output will leave it floating (electrically speaking) and provide the output of the sensor 14 directly to the WU-input with no disturbance or load. However, grounding the GP-output will load the output of the sensor 14 and thereby reduce the signal received or sensed by the WU-input. In effect, as the WU-input of the processor 12 will not facilitate waking up the processor 12 on the basis of signals under the high level input threshold, the overall sensitivity of the sensor 14—or rather the sensitivity to the output of the sensor 14—is reduced. Due to the voltage divider provided by the resistor R and the internal output resistance of the sensor 14, the sensor then needs to provide a larger signal in order to wake up the processor 12.

Thus, the sensitivity may be set at one of a number of thresholds. If, when set to one threshold, the card or processor is still awoken for no use, the threshold may be further increased.

Actually, the threshold may be set sufficiently high for the enablement or awakening to be rather difficult. In the situation where the sensor 14 is a piezo electric element, the threshold may be set so high that a slow or medium velocity bending will not be sufficient but a fast flexing or actually snapping on the card (hitting the card or banging it against a hard surface) is required.

Also, as the sensor 14 may output different outputs depending on the degree of deformation or the velocity of the deformation, different outputs may be used for selecting different modes in the circuit.

Alternatively, the number of deformations (such as within a predetermined period of time) may be used for selecting a desired mode.

Figure 3:
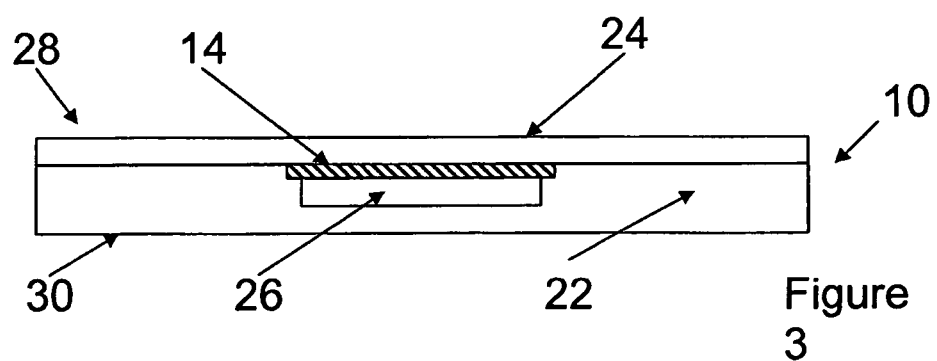
FIG. 3 illustrates one manner of providing a switch in a card according to the invention.

FIG. 3 illustrates a cross section through a card 10 according to an embodiment of the invention. It is seen that the card 10 has a base element 22 into which the sensor 14 is positioned, and that an outer layer 24 is provided for protecting the sensor 14 and for providing a desired surface of the card 10. Naturally, further layers may be provided such as is common in the art of credit cards. The sensor 14 may be laminated/molded/milled into the card in the same manner as silicon dies are in RFID card or micro modules are in chip cards.

Under the sensor 14 is positioned an element or layer 26 which is made of a material which is softer than that of the base element 22. Naturally, the element 26 could simply be provided as a hole or cavity in the base element 22.

Using this set-up, the sensor 14 may be operated by a simple depression thereof into the or toward the element 26, which is then deformed. Thus, no bending or deformation of the card 10 is required in that a part 26 of the card 10 is deformable in a manner so that the sensor 14 is deformable while being laminated into the card 10 and forming no extension or protrusion outside the general flat surface 28 of the card 10.

The fact that the sensor 14, in all embodiments described, may be provided within the card and within the two generally flat main surfaces 28 and 30 of the card 10. Thus, the card 10 may be produced using the known and widely used manufacturing procedures for chip cards, RFID cards, or the like. Thus, there is no risk that the production of the card will result in a defect card 10 due to a switch or the like thereof, which is protruding from the flat surface of the card, has been permanently deformed in the production process.

Figure 4:
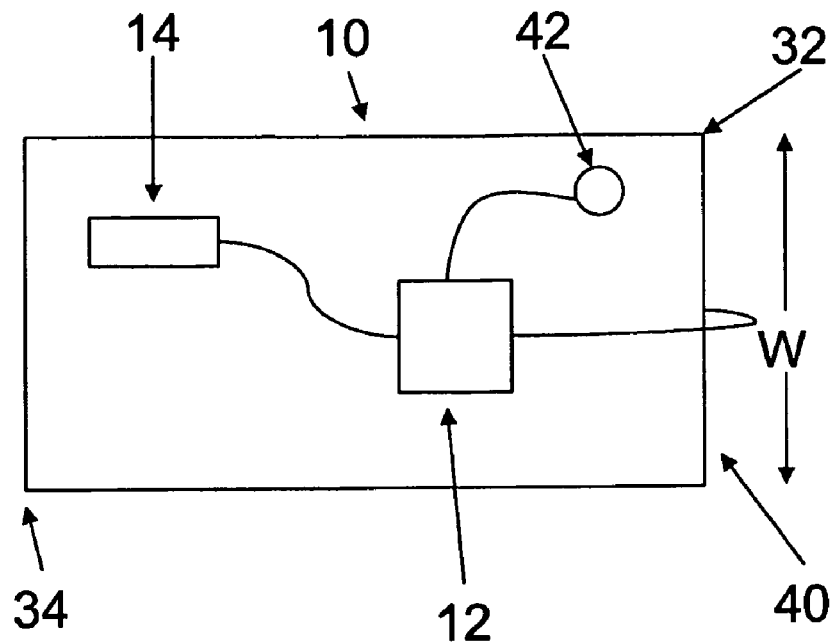
FIG. 4 illustrates a card according to a second preferred embodiment of the invention.
Figure 5:
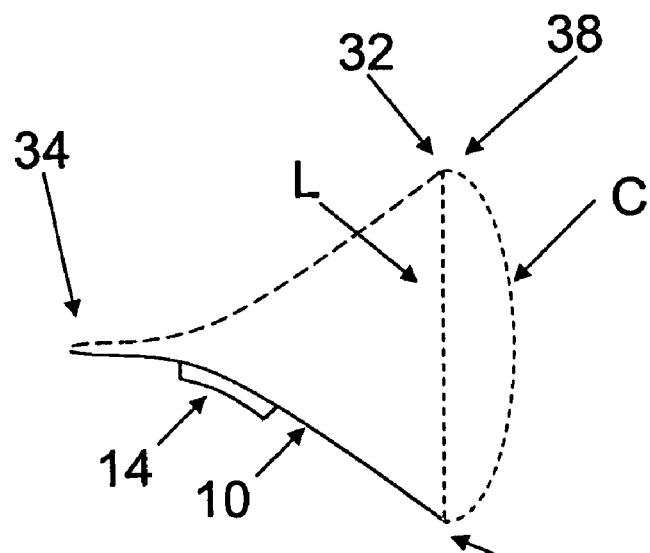
FIG. 5 illustrates the bending during movement/waving of the card of FIG. 4.

A different embodiment of a card according to the present invention is illustrated by FIGS. 4 and 5.

In FIG. 4, the card 10 comprises, at one edge, 32, a row of light emitters 40. The light emitters 40 are controlled by a receiver or controller 12 which receives information from a bending estimator/sensor 14.

The bending estimator 14 may be a piezo electric element, a strain gauge, a pressure sensitive resistor or the like. This estimator 12 is provided on or at the side of the base material 22 (normally plastics) of the card 10 in order for the estimator 14 to be extended or compressed during bending of the card 10 into or out of the plane of the figure and outputs a signal corresponding to the compression/extension.

The estimator and controller 12 may, as the light emitters 40, be laminated into or fixed on the surface of the base element 22 of the card 10 as is known in e.g. credit cards.

The present card 10 is adapted to be held at the edge 34 or close to the edge 34 opposite to the edge 32 and to be "waved". This waving will make the card 10 bend, and this bending will provide information as to the movement of the waving. The estimator 14 is positioned close to the edge 34 in that this is the position where the bending will be the largest. Other positions may also be used, even though these will be bent less.

The information or signal from the estimator 14 is fed to the receiver 12 which may then, also based on a timing circuit provided therein, determine either the degree of bending or the position of the edge 32. It is clear that the bending of the card 10 combined with the period of time having elapsed since e.g. a turning point in a reciprocal, waving movement, will point to the position of the edge 32.

In addition, the bending (acceleration) as well as the time elapsing between successive turning points will provide an estimate of the full length of the reciprocal movement.

Thus, the receiver will be able to both estimate the movement of the edge 32 as well as the actual position of the edge 32 and the light emitters 40.

When wishing to provide information using light emitted by the emitters 40, the controller 12 has therein information relating to a 2D image or the like which is to be provided. This image may be a picture, photo, or text. Any type of 2D information may be provided.

As this information is provided during waving and by one or more relatively narrow, elongated row(s) of light emitters 40, the controller 12 forwards information or signals to the light emitters 40 corresponding to the position of the edge 32 in the reciprocal movement. This information is used by the controller 12 to forward the correct part of the 2D information to the emitters 40 in order for the resulting provided information to correspond to the 2D information. This position determination is relatively important in that the overall image seen would otherwise jump from passing to passing of the reciprocal movement.

In one embodiment, the controller 12 tracks the movement of the edge 32 and adapts the total reciprocal distance to the width of the 2D information in order to be able to present all of the 2D information.

Alternatively, the 2D information may require (in order to have e.g. the correct resolution or the like) a minimum waving distance. If the present waving does not obtain this distance, the controller may decide to provide only a part of the 2D information. Thus, the text "Mickey is a mouse" may be provided, if the minimum distance is obtained, but only "Mickey" or "Mickey is a" is obtained if smaller distances are obtained during the waving. The same may be the situation with an image.

In another manner, the 2D information may scroll over the "surface" or "display" generated by the reciprocating movement of the emitters 40. This scrolling may be vertical, as the credits at the end of a movie, or horizontal as a ticker tape display displaying e.g. stock quotes.

This embodiment may be altered to the situation where not only the relative position of the edge 32 in relation to e.g. the edge 34 is tracked but the actual position of the edge 32, whereby waving the card 10 a small distance and providing "Mickey" and then moving the card in the direction from the "M" to the "y" will make the controller provide "is a" instead, and further movement in that direction will provide the "mouse". Thus, a small distance of the waving may be compensated for by a movement of the card 10 in that direction while still waving the smaller distance.

In another embodiment, the extent along the width W of the row of light emitters of the information provided may be varied to take into account the actual distance of the waving. Thus, if the 2D information to be provided should have a certain relation between the direction of W and that perpendicular thereto, a smaller distance of waving may reduce the extent of the provided information along W. Waving a longer distance may make the controller 12 increase the number of light emitters used so as to also increase the extent of the information (such as an image) along the direction of W.

In the example of a text, the controller 12 may alter the font size for the text to be fully represented over the actual distance waved. Waving a larger distance will then make the font size increase.

In one embodiment, the card 10 is also adapted to output a sound. The controller 12 may then hold information relating to the sound. In fact, some bending estimators, such as the piezo electric crystal, may be able to also output sound if receiving a corresponding signal. Thus, the bending estimator 14 may also be used for receiving a signal from the controller 12 and for outputting a corresponding sound. In order to be able to use the estimator 14 for both purposes, it may be desired to only enable the sound outputting action when no bending and light providing takes place.

FIG. 5 illustrates the waving/bending seen from above. The card 10 is illustrated in one extreme position 36, and the other extreme position is illustrated at 38.

The distance travelled by the edge 32 may be seen as that along the actual curve C which the edge travels through, or it may be taken as the position along a straight line L between the extreme points 36, 38.

The user viewing the presented information from the right in the figure will of course see information presented from the curve C. The controller 12, however, may correct the timing of transmitting the individual parts of the information to the emitters 40 so as to emulate the providing of the information on a flat screen. Thus, this requires that the controller 12 does not output all parts (in the direction into and out of the plane of FIG. 5) equally spaced along the curve C, but equally spaced along the line L.

Naturally, the controller 12 may not provide any information before the card 10 has been waved a few times in order for the controller 12 to obtain knowledge about the waving (distance, bending, velocity, acceleration or the like) and to determine how to provide the information at different positions of the movement. Otherwise, or in addition, the controller 12 may be adapted to adapt to changes in waving distance so as to alter the information provided during waving.

Also, the controller 12 may provide the information when moving only in one direction (up-down or down-up in FIG. 5) or it may provide information in both directions.

Any number of rows of light emitters may be used. Also, any type of light emitter 40 may be used (LED, laser, VXEL or the like). Also, monochrome light emitters 40 may be used, such as mixed with other emitters of other colours, or light emitters may be used being able to output varying colours.

Naturally, the card may be provided with multiple sets of estimator 14 and emitters 40, such as when the emitters 40 of another set is provided at another edge, such as the edge 34, and the estimator 14 relating to that set of emitters 40 is provided oppositely, that is, close to the edge 32. In that situation, the two different sets may be used for providing two different messages or information. Also, two different controllers 12 may be provided, or the controller 12 may decide which set to use by determining which estimator 14 detects the largest bending.

Also, 3D images or information may be provided by providing emitting means in different distances from the edge 32. In this manner, a plurality of 2D information is to be provided, one for each set of emitting means—i.e. one for each "depth" for which information is available. These additional emitting means may be provided at a distance from the edge 32 on a side surface of the card 10 or inside the card, if the base material thereof is translucent.

The controller 12 may be pre-set for any type of information or may be able to output only predetermined information. The controller 12 may be able to alter the information provided in any suitable manner, such as stochastically or sequentially changing between information stored therein or by communicating with external equipment adapted to enter the information to be provided into the controller 12. This communication may be wireless or via a wire.

Alternatively, the card 10 may comprise a keyboard, such as keyboard of switches as illustrated in FIG. 3. Further alternatively, the card 10 may comprise an optical sensor 42 connected to the controller 12. The optical sensor 42 may be exposed to e.g. a computer monitor which is operated to modulate radiation emitted thereby in order to transmit information to the controller 12 via the sensor 42. Naturally, all other types of information transfer may be used, such as via the magnetic strip 18, RFID, Bluetooth, Wireless Ethernet or any other standard.

In general, these methods may be used for controlling a mode of operation of the controller 12 or may be used for entering into the controller 12 information which is desired provided by the emitters 40.

The invention being thus described, it will be apparent that the same may be varied in many ways. Such variations are not to be regarded as a departure from the spirit and scope of the invention, and all such modifications as would be recognized by one skilled in the art are intended to be included within the scope of the following claims.

The invention claimed is:

1. A portable card comprising an electronic circuit adapted to operate in each of a first mode and a second mode, a sensing member electronically connected to the circuit, and a power source connected to the circuit, said circuit including a processor configured to transition from the first mode to the second mode when receiving a signal or power from the sensing member, the first mode being a sleep mode and the second mode being an operating mode of the processor, said sensing member including a piezo electric element not connected to the power source and adapted to output the signal or power when being deformed.

2. The card according to claim 1, wherein said card has outer dimensions including a length of less than 10 cm, a width of less than 5 cm, and a thickness of less than 2 mm.

3. The card according to claim 1, wherein the card includes a flexible base element to which the sensing member is fixed.

4. The card according to claim 3, wherein the card includes a component for determining, on the basis of the signal from the sensing member, second information or signals to be provided to the display element.

5. The card according to claim 1, wherein, in a cross section perpendicular to a plane of the card, the sensing member is provided adjacent to a layer being softer at a center of the sensing member than at outer parts thereof.

6. The card according to claim 1, further comprising circuitry for reducing a sensitivity to deformation of the sensing member.

7. The card according to claim 6, wherein the circuit further comprises an operating element adapted to be operated and initiate a task, the sensitivity reducing circuitry being operated if a predetermined number of deformations of the sensing member have been detected while no operation of the operating element has been performed.

8. The card according to claim 1, further comprising a display element for presenting visual information.

9. A method of operating a portable card comprising an electronic circuit, that includes a processor, a sensing member including a piezo electric element, and a power source connected to the circuit and not connected to the piezo electric element, the method comprising the steps of deforming the piezo electric element; outputting, by the piezo electric element in response to said step of deforming, a signal or power; and receiving, by the processor, the signal or power from the piezo electric element and transitioning from a sleep mode to an operating mode.

10. The method according to claim 9, wherein the card has a flexible base layer to which the sensing member is fixed, and the deforming step includes bending the card.

11. The method according to claim 9, wherein, in a cross section perpendicular to a plane of the card, the sensing member is provided adjacent to a layer being softer at a center of the sensing member than at outer parts thereof, and the deforming step includes forcing at least a central portion of the sensing member toward the softer layer and thereby deforming the softer layer.

12. The method according to claim 9, further comprising the step of reducing a sensitivity of the sensing member.

13. The method according to claim 12, wherein the reducing step is preceded by the step of sensing a predetermined number of deformations of the sensing member while receiving no instruction to perform additional tasks.

14. The method according to claim 12, further comprising the step of the circuit providing, on the basis of the signal from the sensing member, second information to a display element.

15. The method according to claim 9, further comprising the step of presenting visual information to a user from the card.

16. A portable card comprising an electronic circuit adapted to operate in each of a first mode and a second mode, a sensing member electronically connected to the circuit, and a power source connected to the circuit, said circuit including a processor configured to transition from the first mode to the second mode when receiving a signal or power from the sensing member, the first mode being a sleep mode and the second mode being an operating mode of the processor, said sensing member, in a cross section perpendicular to a plane of the card, being provided adjacent to a layer that is softer at a center of the sensing member than at outer parts thereof, and said sensing member being not connected to the power source and adapted to output the signal or power when being deformed.

17. The card according to claim 16, wherein said card has outer dimensions including a length of less than 10 cm, a width of less than 5 cm, and a thickness of less than 2 mm.

18. The card according to claim 16, wherein the card includes a flexible base element to which the sensing member is fixed.

19. The card according to claim 16, wherein the sensing member includes a piezo electric element.

20. The card according to claim 16, further comprising circuitry for reducing a sensitivity to deformation of the sensing member.

21. The card according to claim 20, wherein the electronic circuit further comprises an operating element adapted to be operated and initiate a task, the sensitivity reducing circuitry being operated if a predetermined number of deformations of the sensing member have been detected while no operation of the operating element has been performed.

22. The card according to claim 16, further comprising a display element for presenting visual information.

23. The card according to claim 22, the card comprising a component for determining, on the basis of the signal from the sensing member, second information or signals to be provided to the display element.

* * * * *